(12) United States Patent
Abruzzio

(10) Patent No.: US 10,214,081 B2
(45) Date of Patent: Feb. 26, 2019

(54) SUNGLARE VISOR X

(71) Applicant: Allan N. Abruzzio, Dracut, MA (US)

(72) Inventor: Allan N. Abruzzio, Dracut, MA (US)

( * ) Notice: Subject to any disclaimer, the term of this patent is extended or adjusted under 35 U.S.C. 154(b) by 48 days.

(21) Appl. No.: 15/436,739

(22) Filed: Feb. 17, 2017

(65) Prior Publication Data
US 2017/0240026 A1 Aug. 24, 2017

Related U.S. Application Data

(63) Continuation-in-part of application No. 29/565,039, filed on May 17, 2016, now Pat. No. Des. 797,629.

(60) Provisional application No. 62/389,326, filed on Feb. 23, 2016.

(51) Int. Cl.
*B60J 3/02* (2006.01)

(52) U.S. Cl.
CPC .................. *B60J 3/0217* (2013.01)

(58) Field of Classification Search
CPC ........ B60J 3/0213; B60J 3/026; B60J 3/0217; B60J 3/0265
USPC ...................................... 296/97.12
See application file for complete search history.

(56) References Cited

U.S. PATENT DOCUMENTS 2,454,613 A * 11/1948 Peltier .................... B60J 3/0217
                                                                                    248/278.1
2017/0313163 A1* 11/2017 Watts ...................... B60J 3/026

\* cited by examiner

*Primary Examiner* — Pinel E Romain
(74) *Attorney, Agent, or Firm* — Michael J. Foycik, Jr.

(57) ABSTRACT

A visor can be manually positioned in a number of directions such that it is manually rotatable about an axis of rotation, and wherein that axis of rotation is itself manually pivotable through a range of angles about a pivot member. The visor manually repositionable, and includes a visor blade, a blade holder for securing the visor blade, a visor clip, and a pivot ball for connecting the blade holder and the visor clip. The pivot ball is repositionable throughout a range of angular motion; and the pivot ball has an axis.

1 Claim, 13 Drawing Sheets

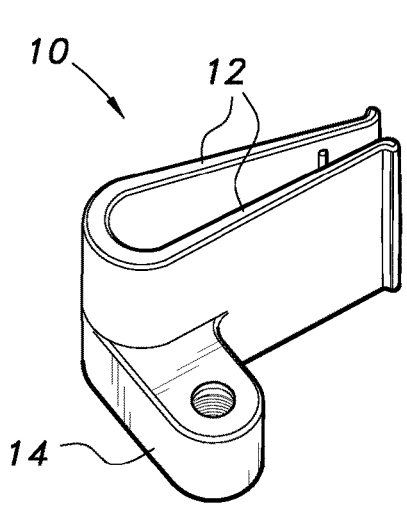
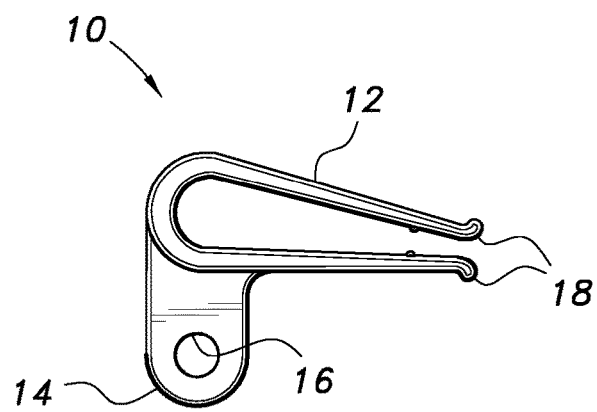
FIG. 3     FIG. 4
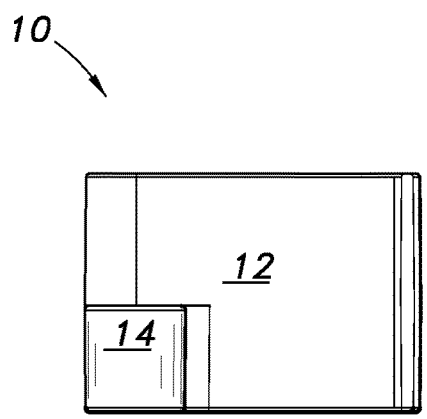
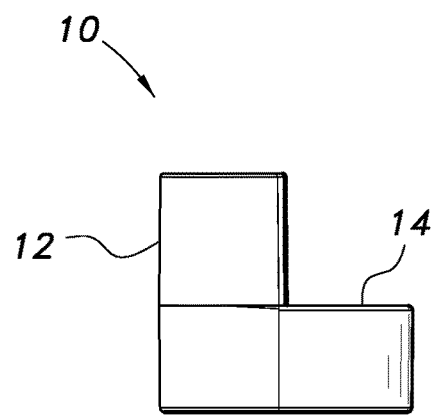
FIG. 5     FIG. 6

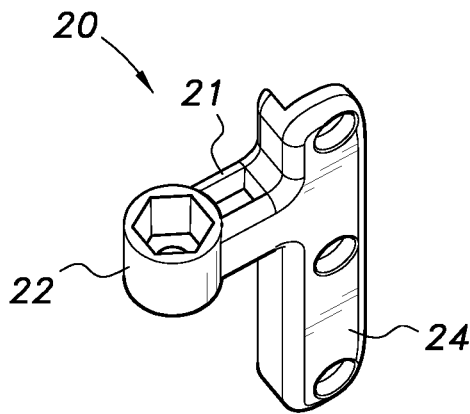
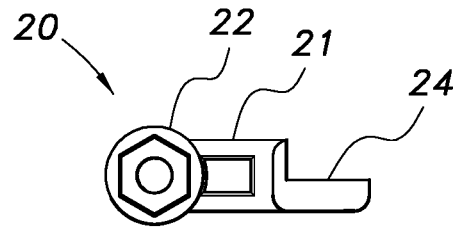
FIG. 7　　　　FIG. 8
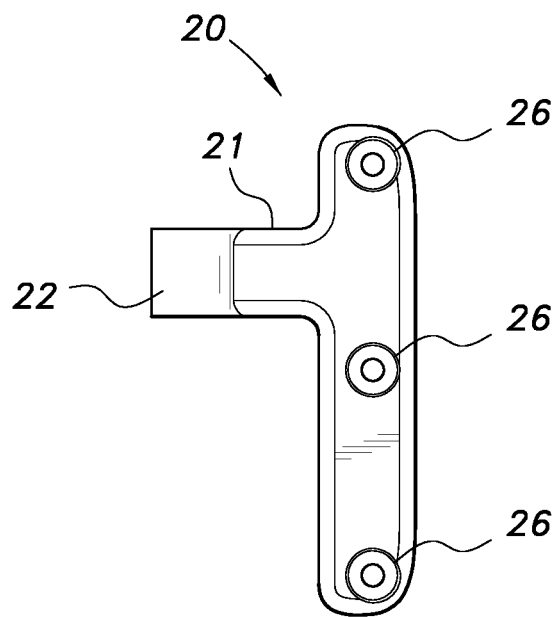
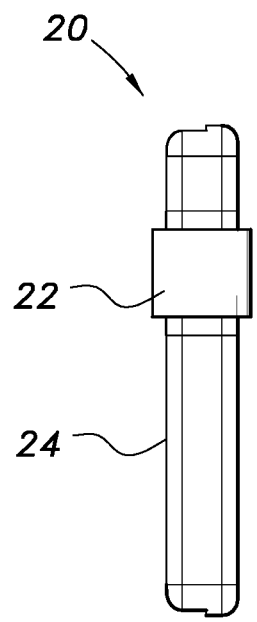
FIG. 9　　　　FIG. 10

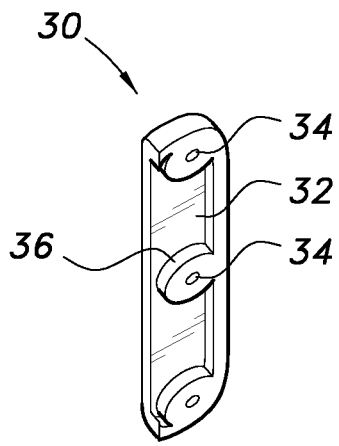
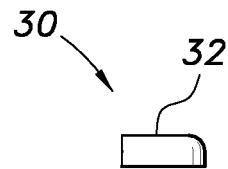
FIG. 11  FIG. 12
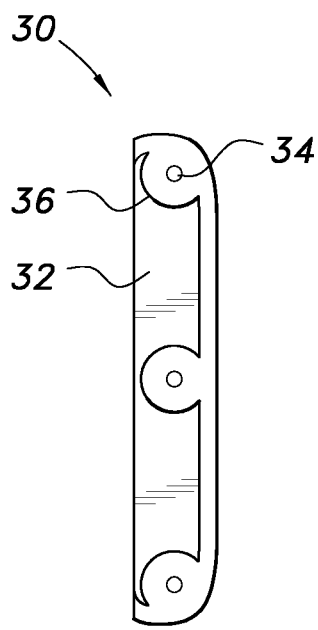
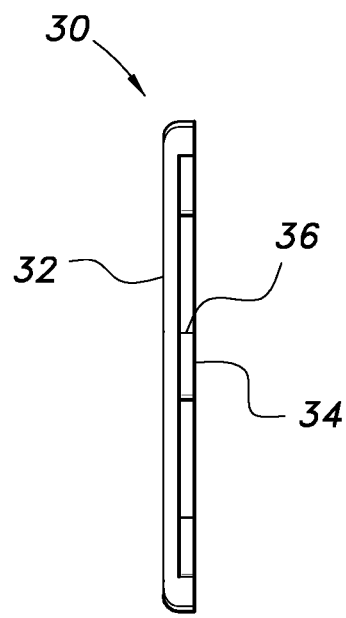
FIG. 13  FIG. 14

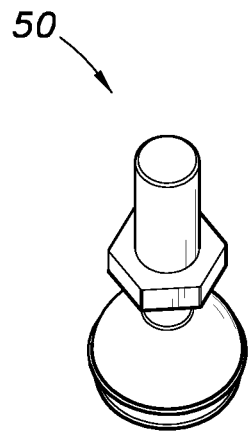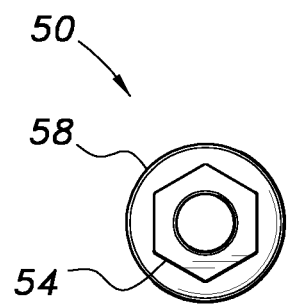
*FIG. 19*  *FIG. 20*
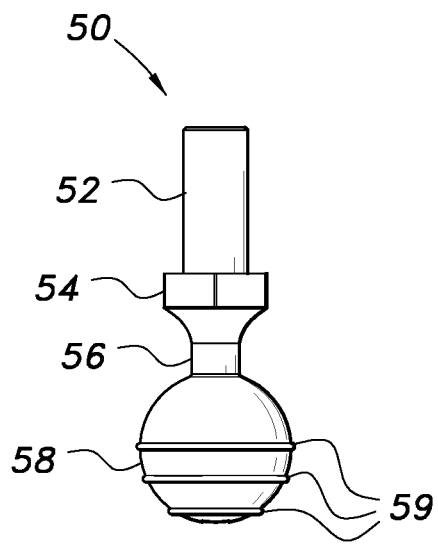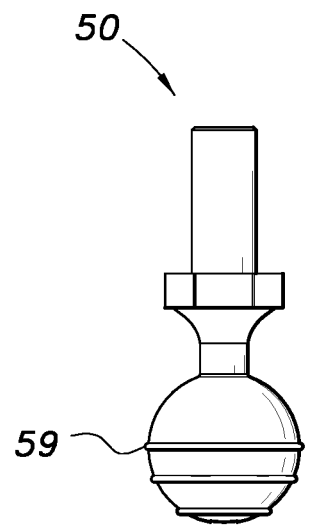
*FIG. 21*  *FIG. 22*

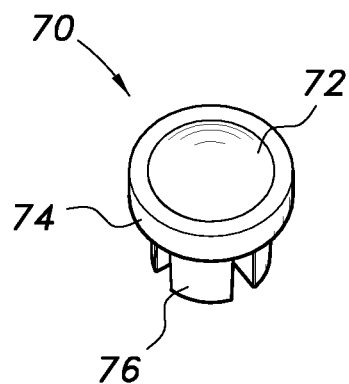
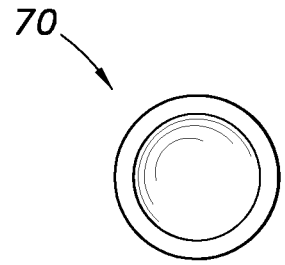
FIG. 27    FIG. 28
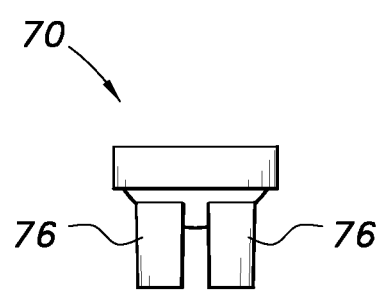
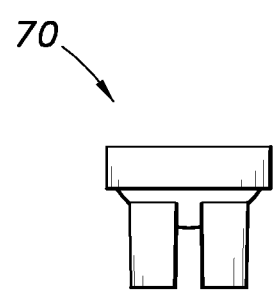
FIG. 29    FIG. 30

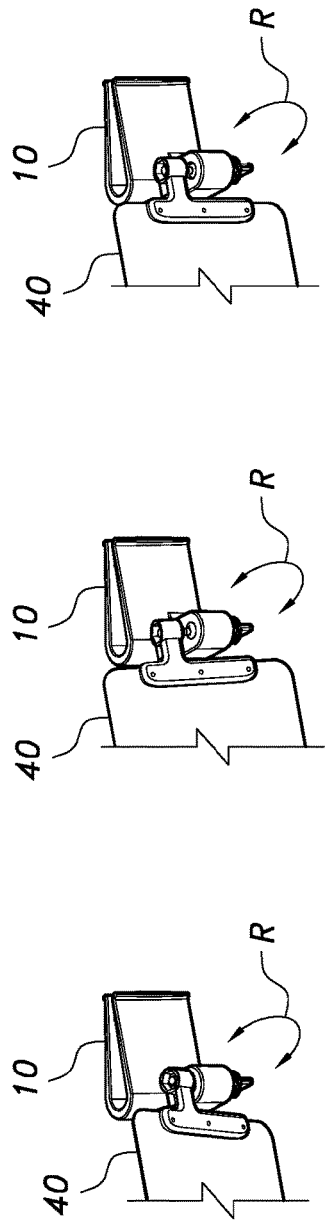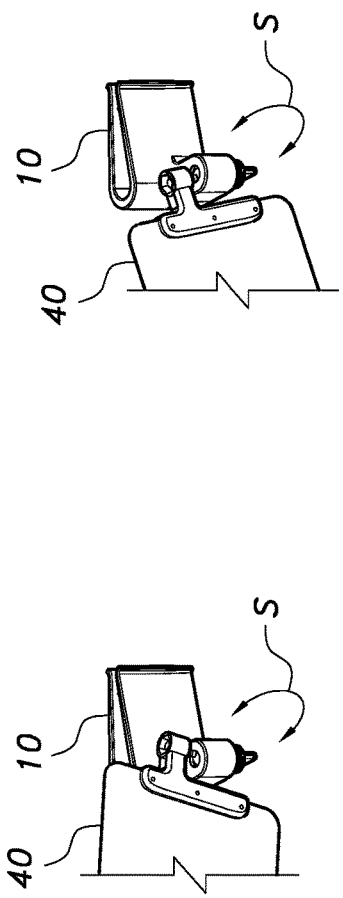
FIG. 32  FIG. 33  FIG. 34  FIG. 35  FIG. 36

SUNGLARE VISOR X

CROSS REFERENCE TO RELATED APPLICATIONS

This application claims the priority of Provisional Application No. 62/389,326 filed on Feb. 23, 2016, inventor Allan N. Abruzzio, entitled "Sun Glare Visor X". The entire disclosure of this provisional patent application is hereby incorporated by reference thereto, in its entirety. This application also claims the priority of Design Patent application Ser. No. 29/565,039 filed on May 17, 2016, inventor Allan N. Abruzzio, entitled "Sunglare Visor". The entire disclosure of this design patent application is hereby incorporated by reference thereto, in its entirety.

STATEMENT REGARDING FEDERALLY SPONSORED RESEARCH OR DEVELOPMENT

Not applicable.

FIELD OF THE INVENTION

The present invention relates to visors, and particularly adjustable visors that can be moved to different positions.

BACKGROUND OF THE INVENTION

It is a problem in the art to provide a visor. Such visors can be used anywhere that they are needed to block light, such as in vehicles. Visors can also be used near bright sources of light, such as near lamps and large windows. Most such visors can be manually moved in a single direction, such as folding down, or rotating into a down or up position. It is a problem in the art to provide an adjustable visor that can move in more than one direction.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a visor than can be manually positioned in a number of directions such that it is manually rotatable about an axis of rotation, and wherein that axis of rotation is itself manually pivotable through a range of angles about a pivot member.

The visor of the present invention is manually repositionable, and includes:

a visor blade;
a blade holder for securing the visor blade;
a visor clip;
a pivot ball for connecting the blade holder and the visor clip, the pivot ball being repositionable throughout a range of angular motion; and the pivot ball having an axis;
wherein the visor blade can be manually positioned throughout the range of angular motion, and wherein the visor blade can be pivoted about the axis of the pivot ball.

Other objects and advantages of the present invention will be more readily apparent from the following detailed description when read in conjunction with the accompanying drawings.

BRIEF DESCRIPTION OF THE DRAWINGS

FIG. 3 is a perspective view of a main visor clip, used in the visor of FIG. 1.

FIG. 4 is a top elevational view of the main visor clip of FIG. 3.

FIG. 5 is a front elevational view of the main visor clip of FIG. 3.

FIG. 6 is a side elevational view of the main visor clip of FIG. 3.

FIG. 7 is a perspective view of a blade holder, used in the visor of FIG. 1.

FIG. 8 is a top elevational view of the blade holder of FIG. 7.

FIG. 9 is a front elevational view of the blade holder of FIG. 7.

FIG. 10 is a side elevational view of the blade holder of FIG. 7.

FIG. 11 is a perspective view of a blade holder back brace, used in the visor of FIG. 1.

FIG. 12 is a top elevational view of the blade holder back brace of FIG. 11.

FIG. 13 is a front elevational view of the blade holder back brace of FIG. 11.

FIG. 14 is a side elevational view of the blade holder back brace of FIG. 11.

FIG. 19 is a perspective view of a ribbed pivot ball, used in the visor of FIG. 1.

FIG. 20 is a top elevational view of the ribbed pivot ball of FIG. 19.

FIG. 21 is a front elevational view of the ribbed pivot ball of FIG. 19.

FIG. 22 is a side elevational view of the ribbed pivot ball of FIG. 19.

FIG. 27 is a perspective view of a pressure plug rubber bushing, used in the visor of FIG. 1.

FIG. 28 is a top elevational view of the pressure plug rubber bushing of FIG. 27.

FIG. 29 is a front elevational view of the pressure plug rubber bushing of FIG. 27.

FIG. 30 is a side elevational view of the pressure plug rubber bushing of FIG. 27.

FIG. 32 is a close up perspective view showing relative rotation between the clip and blade of FIG. 1, showing the blade tilted slightly forward with its upper edge tilted upward from the plane of the drawing.

FIG. 33 is a close up perspective view showing relative rotation between the clip and blade of FIG. 32, showing the blade tilted slightly backward.

FIG. 34 is a close up perspective view showing relative rotation between the clip and blade of FIG. 1, showing the blade in an upright position.

FIG. 35 is a close up perspective view showing relative rotation between the clip and blade of FIG. 32, showing the blade rotated in a clockwise direction relative to the clip, as viewed in the plane of the figure.

FIG. 36 is a close up perspective view showing relative rotation between the clip and blade of FIG. 1, showing the blade rotated in a counter clockwise direction relative to the clip, as viewed in the plane of the figure.

DETAILED DESCRIPTION OF THE INVENTION

Figure 1:
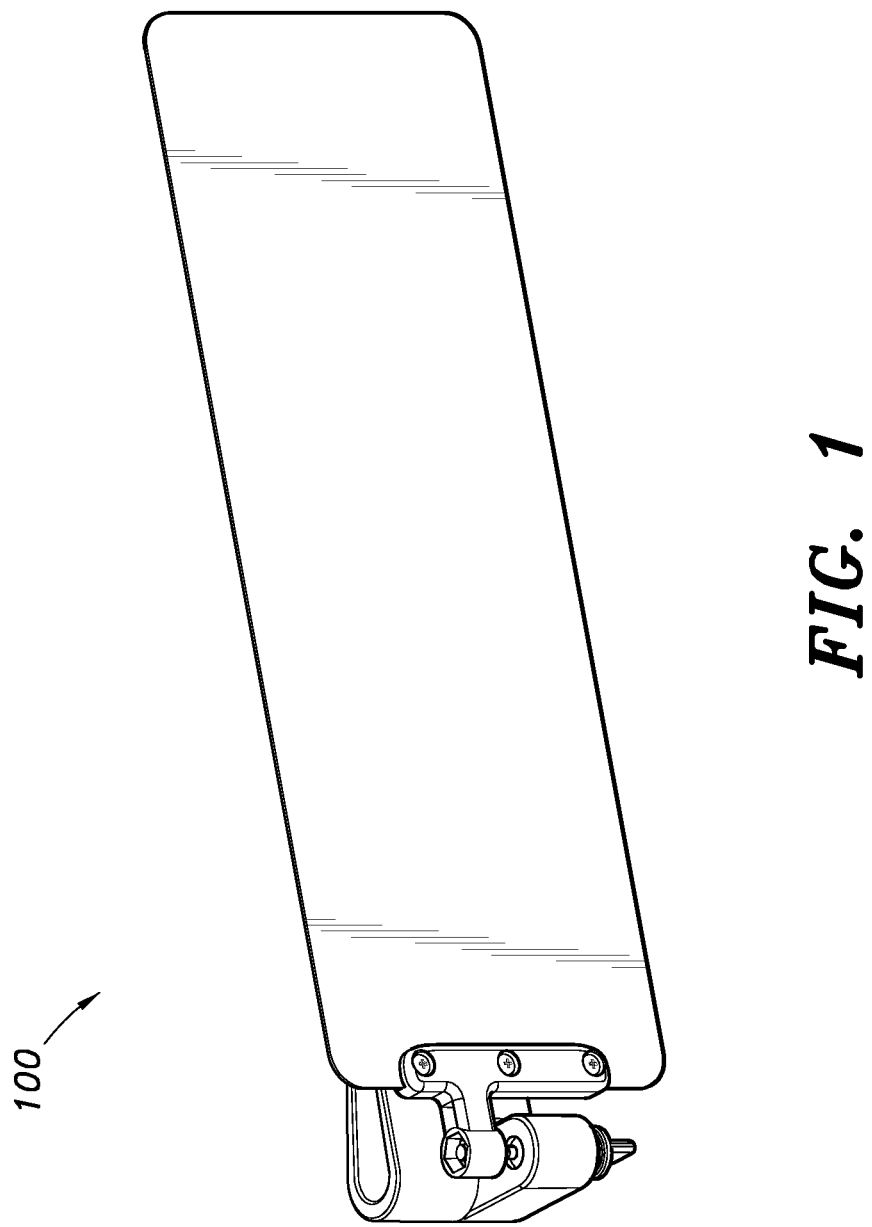
FIG. 1 is a front perspective view of a Sunglare Visor X, according to the present invention.

FIG. 1 is a front perspective view of a visor 100, according to the present invention. FIG. 1 illustrates in dashed outline various positions and angles in which the visor 100 can be moved and turned.

Figure 2:
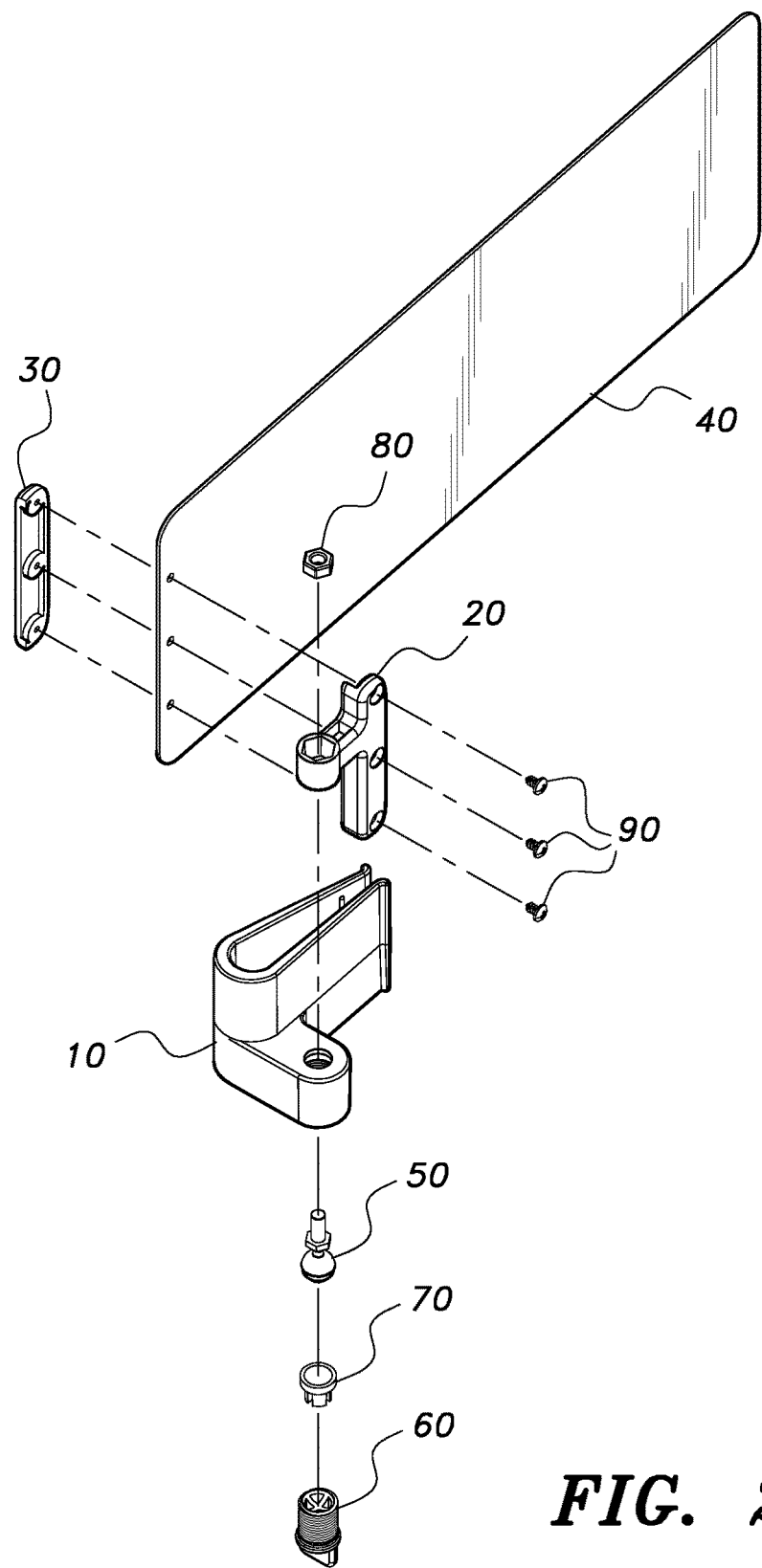
FIG. 2 is an exploded view of the visor of FIG. 1.

FIG. 2 is an exploded view of the visor 100 of FIG. 1. This is an exploded view showing the elements of the visor 100, including a main visor clip 10, a blade holder 20, a blade holder back brace 30, a tinted blade 40, a ribbed pivot ball 50, a pressure plug 60, a pressure plug rubber bushing 70, a pivot ball lock nut 80, and a plurality of blade holder screws 90.

FIG. 3 is a perspective view of a main visor clip 10, used in the visor 100 of FIG. 1. As seen in FIG. 3 there is a flange 14 having a threaded bore 16 (indicated also in FIG. 4), and is discussed further below.

FIG. 4 is a top elevational view of the main visor clip 10 of FIG. 3. Here, the main visor clip 10 includes a pair of arms 12 adapted to clip onto and engage a thin support member (not shown) in a vehicle. Such thin support members can include existing structures such as arms or blades, or can be installed separately by the user.

The main visor clip 10 also includes a flange 14 having a threaded bore 16. The threaded bore receives the ribbed pivot ball 50, the pressure plug 60, and the pressure plug rubber bushing 70. This assembly is described in further detail below, and enables the ribbed pivot ball secured to the blade 40 to pivot relative to the flange 14 which is secured to a support by the arms 12, 12. In this way, the blade 40 can be rotated and tilted relative to the main visor clip 10.

FIG. 7 is a perspective view of a blade holder 20, used in the visor 100 of FIG. 1. The blade holder 20 is an armature that holds the tinted blade 40 with three screws 90 that pass through to the blade holder back brace 30 as shown in FIG. 2. The blade holder 20 includes a brace portion 24 having three bores 26, and includes an arm 21 having a socket 22.

FIG. 8 is a top elevational view of the blade holder 20 of FIG. 7.

FIG. 9 is a front elevational view of the blade holder 20 of FIG. 7.

FIG. 10 is a side elevational view of the blade holder 20 of FIG. 7.

FIG. 11 is a perspective view of a blade holder back brace 30, used in the visor 100 of FIG. 1. The blade holder back brace 30 adds support, and is used in the manner discussed above, to secure the tinted blade 40. The blade holder back brace 30 includes a brace wall 32 having three bores 34 with sidewalls 36.

FIG. 12 is a top elevational view of the blade holder back brace 30 of FIG. 11.

FIG. 13 is a front elevational view of the blade holder back brace 30 of FIG. 11.

FIG. 14 is a side elevational view of the blade holder back brace 30 of FIG. 11.

Figure 15:
FIG. 15 is a perspective view of a tinted blade, used in the visor of FIG. 1.

FIG. 15 is a perspective view of a tinted blade 40, used in the visor of FIG. 1. The tinted blade 40 has a body 42 and is generally transparent, using tint to reduce sun glare. In a preferred embodiment, the tinted blade 40 is composed of an optically clear acrylic sheet 42 for the purpose of filtering out glare from the sun. A plurality of bores 44 are includes in the body 42, to allow the fasteners 90 to pass through between the blade holder back brace 30 and the blade holder 20.

The tinted blade 40 can in the alternative include polarized layers, to reduce sun glare using polarization. Additionally, the tinted blade 40 can employ tinting together with polarization, as a further embodiment of the invention. The tinted blade 40 can be similar in thickness and dimensions to an automobile visor, or it can be somewhat larger or smaller; all such variations are contemplated as being within the scope of the present invention.

Figure 16:
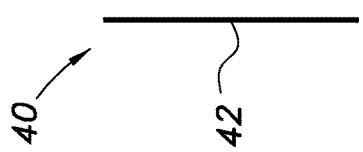
FIG. 16 is a top elevational view of the tinted blade of FIG. 15.

FIG. 16 is a top elevational view of the tinted blade 40 of FIG. 15.

Figure 17:
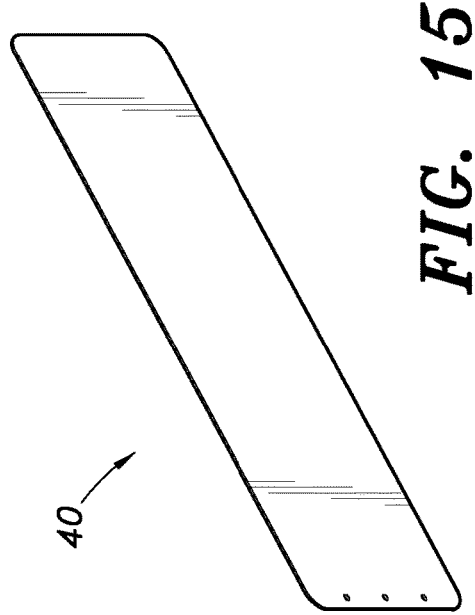
FIG. 17 is a front elevational view of the tinted blade of FIG. 15.

FIG. 17 is a front elevational view of the tinted blade 40 of FIG. 15.

Figure 18:
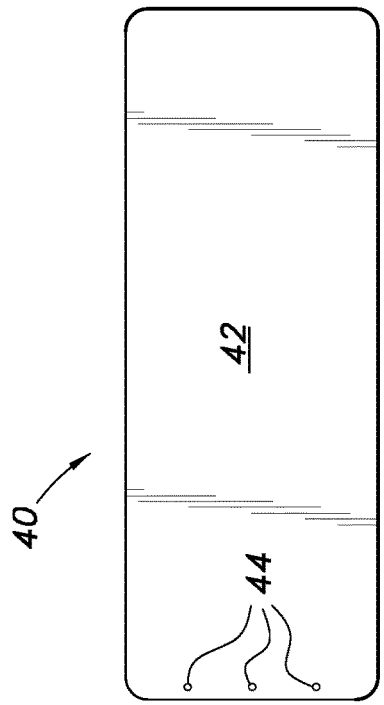
FIG. 18 is a side elevational view of the tinted blade of FIG. 15.

FIG. 18 is a side elevational view of the tinted blade 40 of FIG. 15.

FIG. 19 is a perspective view of a ribbed pivot ball 50, used in the visor 100 of FIG. 1. The ribbed pivot ball 50 includes a stem portion 52, a nut portion 54, a neck 56, and a ball portion 58 having three ribs 59. The first of the ribs 59 is disposed horizontally at the widest portion of the ball portion 58. The third of the ribs 59 is disposed adjacent the bottom end of the ball portion 58, while the second of the ribs 59 is disposed midway between the first rib and the third rib of the ribs 59.

As seen in FIG. 2 and in FIGS. 19-22, the upper end 52 of the ribbed pivot ball 50 is attached to the blade holder 20 with the lock nut 80, the upper end 52 is preferably a threaded member adapted to engage with the lock nut 80. When assembled, the ribbed pivot ball 50 resides inside the bore 16 of the main visor clip 10, and the pressure plug rubber bushing 70 is pushed into abutment with the ribs 59 and the lower end of the ribbed pivot ball 50, which helps lock the ribbed pivot ball 50 in position. Then, the pressure plug 60 is threaded into the bore 16 of the main visor clip 10, and manually tightened to firmly secure the ribbed pivot ball against the pressure plug rubber bushing 70.

Due to the construction described above, the blade 40 can be pivoted relative to the clip 10 by pivoting of the ribbed pivot ball 50, by use of sufficient manually applied force to overcome the frictional resistance between the ribbed pivot ball 50 and the pressure plug rubber bushing 70. If the frictional resistance is too strong, the user can manually loosen the pressure plug 60. Alternatively, if there is insufficient friction to keep the blade 40 in place, then the user can manually tighted the pressure plug 60.

The ribbed pivot ball 50 can pivot inside the socket 16 of the main clip 10. There are ribs 59 on the ball portion 58 to help reduce movement of the ball portion 58 when locked down into position.

FIG. 20 is a top elevational view of the ribbed pivot ball 50 of FIG. 19.

FIG. 21 is a front elevational view of the ribbed pivot ball 50 of FIG. 19.

FIG. 22 is a side elevational view of the ribbed pivot ball 50 of FIG. 19.

Figure 23:
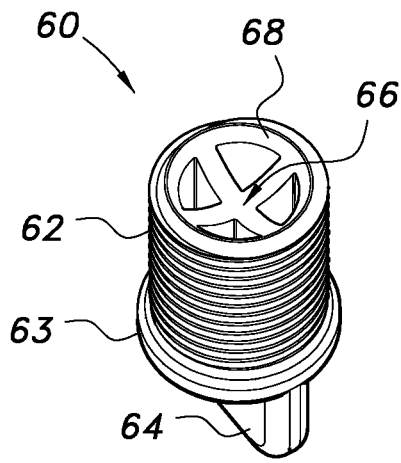
FIG. 23 is a perspective view of the pressure plug, used in the visor of FIG. 1.

FIG. 23 is a perspective view of the pressure plug 60, used in the visor of FIG. 1. The pressure plug 60 threads into the block portion 14, 16 of the main visor clip 10 and when turned puts pressure on the ribbed pivot ball 50.

As seen in FIGS. 23-26, the pressure plug 60 includes a concave portion 66 bounded by a rim 68. The concave portion 66 includes four ribs 67 meeting at a center point. The pressure plug 60 has a threaded portion 62, a landing 63, and a stem portion 64 adapted for manual turning of the pressure plug 60.

Figure 24:
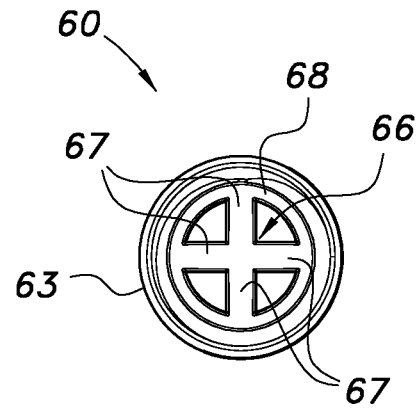
FIG. 24 is a top elevational view of the pressure plug of FIG. 23.

FIG. 24 is a top elevational view of the pressure plug 60 of FIG. 23.

Figure 25:
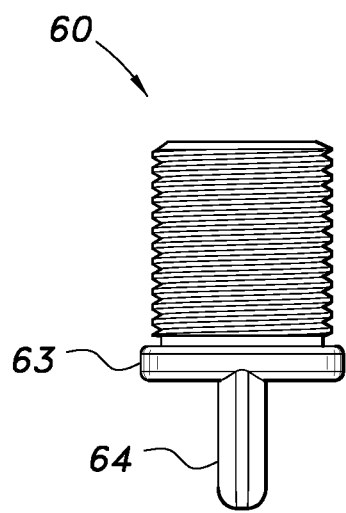
FIG. 25 is a front elevational view of the pressure plug of FIG. 23.

FIG. 25 is a front elevational view of the pressure plug 60 of FIG. 23.

Figure 26:
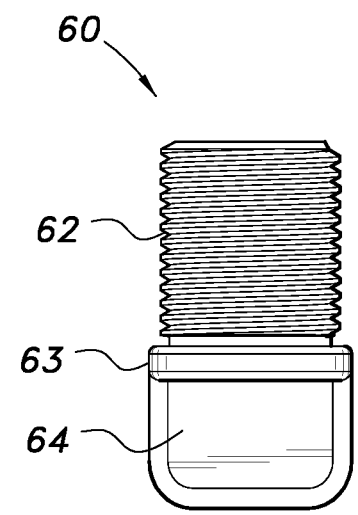
FIG. 26 is a side elevational view of the pressure plug of FIG. 23.

FIG. 26 is a side elevational view of the pressure plug 60 of FIG. 23.

FIG. 27 is a perspective view of a pressure plug rubber bushing 70, used in the visor 100 of FIG. 1. The pressure plug rubber bushing 70 is attached to the end of the pressure plug 60, and adds a cushioned grip to the ribbed pivot ball 50. This conforms to the ribs 59 on the ribbed pivot ball 50 to help reduce unwanted movement.

The bushing 70 has a concave upper surface 72, a rim 74, and four equally spaced legs 76 which are adapted to be received within the spaces between the arms 67 of the pressure plug 60.

The pressure plug 60 can be loosened to facilitate adjustment of the tinted blade 40, and then re-tightened to secure the tinted blade 40 in place so that the tinted blade 40 remains in place.

Alternatively, if the pressure plug 60 is tightened with a minimal force needed to keep the tinted blade 40 in place, then when a sufficiently strong manual force is applied to the tinted visor 40, the tinted visor 40 can be adjusted without loosening of the pressure plug 40.

FIG. 28 is a top elevational view of the pressure plug rubber bushing 70 of FIG. 27.

FIG. 29 is a front elevational view of the pressure plug rubber bushing 70 of FIG. 27.

FIG. 30 is a side elevational view of the pressure plug rubber bushing 70 of FIG. 27.

Figure 31:
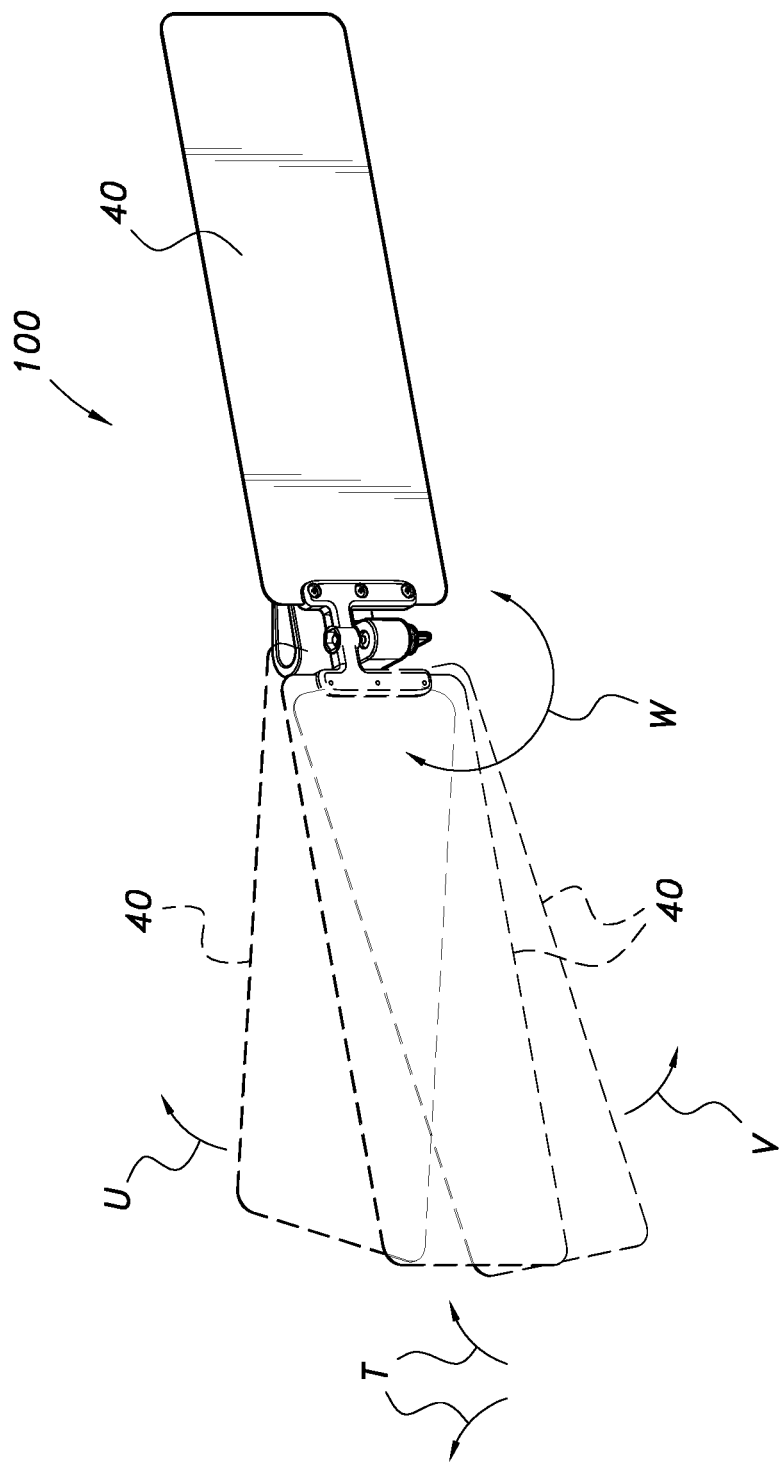
FIG. 31 is a perspective view showing the visor of FIG. 1 in a plurality of different positions shown in dashed outline.

FIG. 31 is a perspective view showing the visor 100 of FIG. 1 in an initial position shown in solid outline as well as in plurality of different positions shown in dashed outline. The rotational direction of repositioning of the blade 40 in FIG. 31 about a vertical axis (i.e. through the center of the bore 16 of the main visor clip 10 is indicated by the double headed arrow W.

In a preferred embodiment, the blade 40 can rotate about its vertical axis in the rotational direction shown by the double-headed arrow W through an angle of 200 degrees (as measured from the initial position shown in solid outline). Further variations are possible, depending on the specific dimensions used, and the present invention is not limited to the specific range of motion of 200 degrees indicated by the double-headed arrow W. Exemplary positions of the blade are shown in FIG. 31, for example the rotation of the blade 40 can be from the original position shown in solid outline in FIG. 31, all the way to the dashed outline positions, and anywhere in between.

In use, the visor 100 is clipped to an existing visor in a vehicle, such as a driver's side visor or a passenger side visor. The existing visor can be in a passenger car, pickup truck, SUV, or truck. For example, in one use, the main visor clip 10 is attached to a left edge of an existing driver's side visor, with the arms 12 receiving the existing visor therebetween. The visor 100 can be clipped in another use onto the right side of an existing passenger side visor. The positioning is not limited to these examples, and the visor 100 can be clipped to any portion of an existing visor, including the top, bottom, left, and right side edges.

Additionally, FIG. 31 depicts two arrows labeled T, one appearing clockwise and up out of the plane of the figure, and the other appearing counter-clockwise and down from the plane of the figure. The arrows T, T are used to indicate transverse pivoting of the blade 40 generally about its longitudinal axis (i.e. an axis lying along the length of the blade 40 and generally transverse to the axis of the bore 16 of the main visor clip 10, which would be out of the plane of the figure. In the preferred embodiment, the blade 40 can be adjusted by twisting it upward and to the right as indicated by the curved arrow labeled T pointing toward the right in FIG. 31 indicating a twisting of the blade 40 resulting in its uppermost edge rising up from the plane of the figure while the lowermost edge moves downward from the plane of the figure. The leftmost arrow T represents an opposite direction of twisting, with the result that the uppermost edge of the blade 40 moves below the plane of the figure, while the lowermost edge of the blade 40 rises up from the plane of the figure. In a preferred embodiment, the range of motion of the blade 40 in the direction shown by the rightmost arrow T can be up to 25 degrees clockwise (as viewed from the end of the blade 40 looking toward the main visor clip 10), and the counter-clockwise rotation of the blade 40 in the direction shown by the leftmost arrow T can be in a range of up to 25 degrees counter-clockwise.

Additionally, the blade 40 can pivot upward in a clockwise direction U shown in FIG. 31, where the end of the blade 40 rises upward, and the blade 40 can pivot downward in a counter-clockwise direction V shown in FIG. 31, where the end of the blade 40 moves downward. This is shown in the dashed outline positions of the blade 40. The range of motion in the direction indicated by the arrow U is preferably in a range of 20 degrees from level. The range of motion in the direction indicated by the arrow V is preferably in a range of 30 degrees from level.

It is also possible for the visor 100 to be clipped to any thin upright support, using the arms 12 to clip the visor 100 onto such upright support. All such uses are contemplated as being within the scope of the present invention.

In FIG. 31, in a preferred embodiment, the value of the arrows shown are as follows:

T=25 degrees, U=20 degrees, V=30 degrees, and W=200 degrees, in the directions shown.

FIG. 32 is a close up perspective view showing relative rotation between the clip 10 and the blade 40 of FIG. 1, showing the blade 40 tilted slightly forward with its upper edge tilted upward from the plane of the drawing. A double-headed arrow R indicates this motion. The motion indicated by the double-headed arrow R in FIGS. 32, 33, and 34 corresponds to the directions T, T of FIG. 31.

In FIG. 32, in a preferred embodiment, the value of R shown is 25 degrees in the direction shown.

FIG. 33 is a close up perspective view showing relative rotation between the clip 10 and the blade 40 of FIG. 32, showing the blade 40 tilted slightly backward.

In FIG. 33, in a preferred embodiment, the value of R shown is zero degrees (0 degrees).

FIG. 34 is a close up perspective view showing relative rotation between the clip 10 and the blade 40 of FIG. 1, showing the blade 40 in an upright position.

In FIG. 34, in a preferred embodiment, the value of R shown is 25 degrees in a direction as shown, which is opposite the direction shown for FIG. 32.

FIG. 35 is a close up perspective view showing relative rotation between the clip 10 and the blade 40 of FIG. 32, showing the blade 40 rotated in a clockwise direction relative to the clip 10, as viewed in the plane of the figure. This rotation is indicated by the double-headed arrow S in FIGS. 35 and 36, and this double-headed arrow S corresponds to the arrows labeled U and V in FIG. 31.

In FIG. 35, in a preferred embodiment, the value of the arrow S is 20 degrees in the direction shown.

FIG. 36 is a close up perspective view showing relative rotation between the clip 10 and the blade 40 of FIG. 1, showing the blade 40 rotated in a counter clockwise direction relative to the clip 10, as viewed in the plane of the figure.

In FIG. 36, in a preferred embodiment, the value of the arrow S is 30 degrees in the direction shown, which is opposite the direction shown in FIG. 35.

Figure 37:
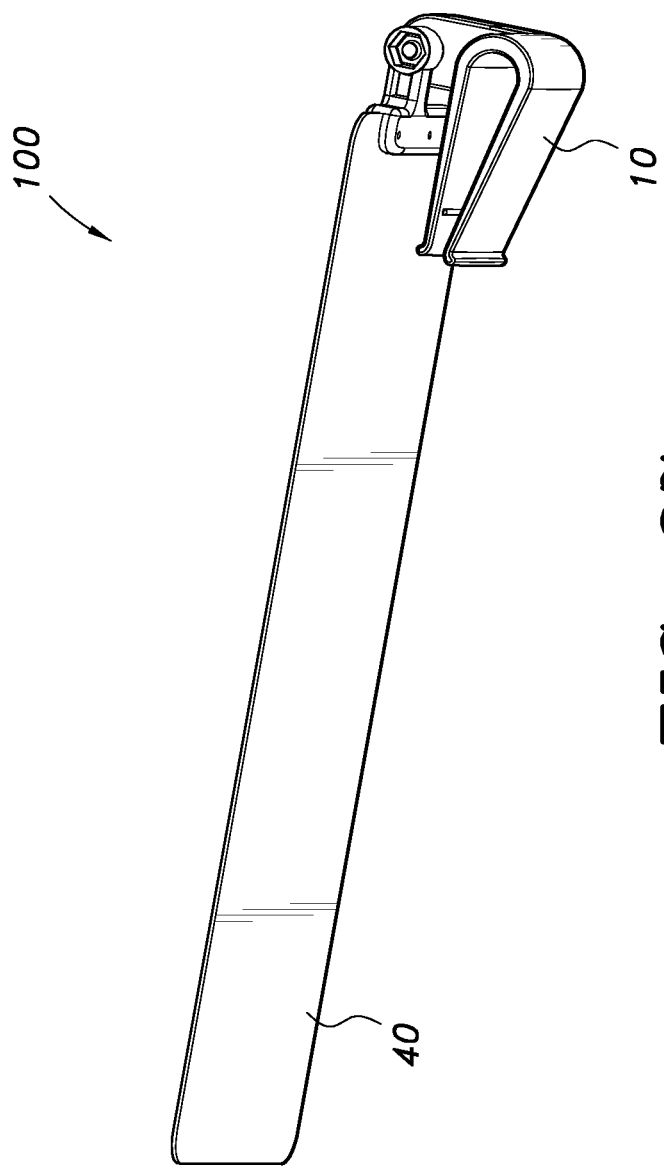
FIG. 37 is a perspective view of the visor of FIG. 1, as viewed from the rear.

FIG. 37 is a perspective view of the visor 100 of FIG. 1, as viewed from the rear.

Figure 38:
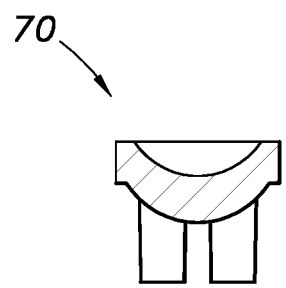
FIG. 38 is a cross sectional view of the pressure plug rubber bushing of FIGS. 27-30.

FIG. 38 is a cross sectional view of the pressure plug rubber bushing 70 of FIGS. 27-30.

Figure 39:
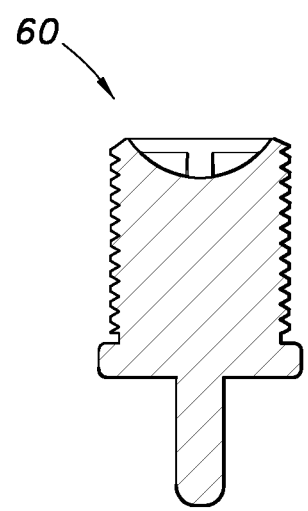
FIG. 39 is a cross sectional view of the pressure plug of FIGS. 23-26.

FIG. 39 is a cross sectional view of the pressure plug 60 of FIGS. 23-26.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A visor that is manually repositionable, comprising:
   a visor blade;
   a blade holder for supporting said visor blade; said blade holder having a threaded bore;
   a main visor clip secured to said blade holder; said main visor clip having two arms adapted to be secured to a thin support; said main visor clip having a threaded bore;
   a pivot ball having a first end and a second end, wherein said first end of said pivot ball is connected to said blade holder supporting said visor blade; said pivot ball being received in said threaded bore in said blade holder;
   a blade holder back brace, connected to said blade holder;
   a pressure plug rubber bushing disposed in said threaded bore of said main visor clip; said pressure plug rubber bushing being in contact with said second end of said pivot ball and is in frictional engagement with said pivot ball;
   a pressure plug having an outer threaded surface in engagement with said threaded bore of said main visor clip; said pressure plug being disposed in said bore such that one end of said pressure plug is in engagement with said pressure plug rubber bushing;
   whereby said pivot ball and said blade are manually rotatable and tiltable relative to said main visor clip so that said blade is manually repositionable throughout a range of rotational motion of over 180 degrees, and is tiltable throughout an angle of approximately 30 degrees.

* * * * *